H. W. STOCK.
SEPARATOR.
APPLICATION FILED JUNE 19, 1915.

1,190,037.

Patented July 4, 1916.
2 SHEETS—SHEET 1.

Inventor:
Henry W. Stock,
by: *[signature]*
His Attorney.

H. W. STOCK.
SEPARATOR.
APPLICATION FILED JUNE 19, 1915.

1,190,037.

Patented July 4, 1916.
2 SHEETS—SHEET 2.

Inventor:
Henry W. Stock,
by His Attorney.

UNITED STATES PATENT OFFICE.

HENRY W. STOCK, OF ERIE, PENNSYLVANIA, ASSIGNOR TO GENERAL ELECTRIC COMPANY, A CORPORATION OF NEW YORK.

SEPARATOR.

1,190,037. Specification of Letters Patent. Patented July 4, 1916.

Application filed June 19, 1915. Serial No. 35,170.

*To all whom it may concern:*

Be it known that I, HENRY W. STOCK, a citizen of the United States, residing at Erie, in the county of Erie, State of Pennsylvania, have invented certain new and useful Improvements in Separators, of which the following is a specification.

The present invention relates to separators for removing from air vaporous material held in suspension therein and has for its object to provide an improved structure for this purpose.

One application of my invention is in connection with compressors used to supply air to internal combustion engines and in the following specification it is so described but it is to be understood that it is not necessarily limited thereto.

In the operation of internal combustion engines having closed crank casings it is desirable for various reasons to maintain the crank chamber under a slight vacuum and to this end it has been proposed to connect the inlet side of the compressor to the crank case so that a greater or less amount of air will be sucked by it therefrom, and to prevent the compressor from sucking oil out of the crank chamber a separator is located in the conduit through which the crank chamber air flows on its way to the compressor. This air which is drawn from the crank case is in reality a fog; that is, the air is impregnated with the very finest particles of oil caused by the temperature within the crank case and by the constant mingling of the rapidly changing air currents with the sprays of oil coming off of the crank bearings and connecting rods. In addition to this fog there are, of course, also minute drops or particles of oil carried in suspension in the air. Separators, as ordinarily in use, are arranged to cause the air in flowing through them to sharply change its direction thereby causing the heavier particles carried along therewith to be thrown out by gravity. This arrangement takes care of the larger particles in a very satisfactory manner, but it does not free the air from the fog therein which will continue along with the air into the compressor.

More specifically the object of my invention is to provide a separator which will not only separate out the heavier particles from the air, but will also effectively remove the fog therefrom.

For a consideration of what I believe to be novel and my invention, attention is directed to the accompanying specification and the claims appended thereto.

Figure 1:
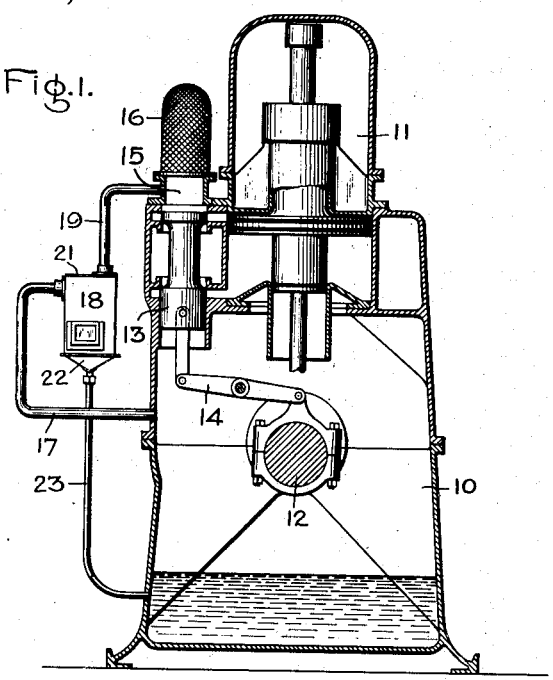
Figure 3:
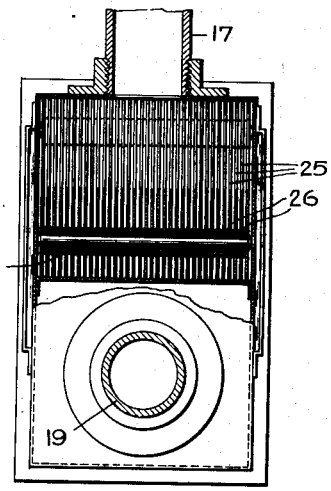
Figure 2:
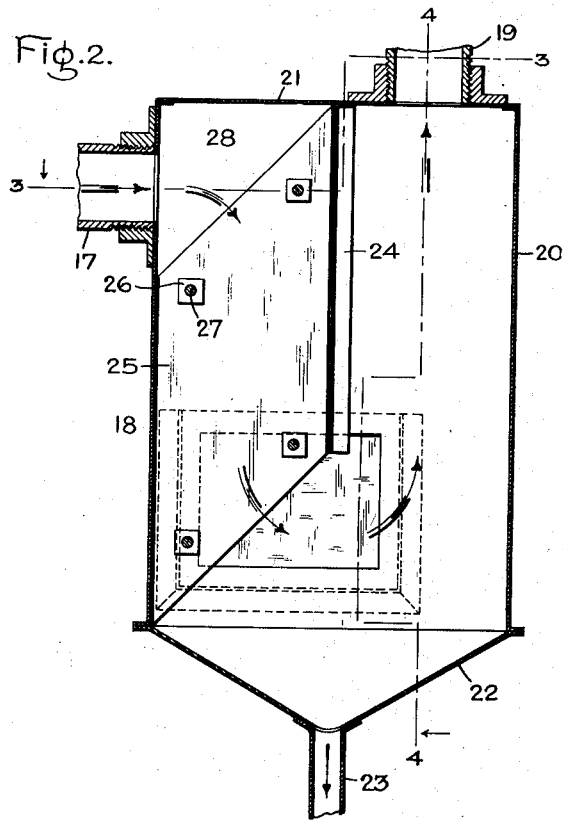
Figure 4:
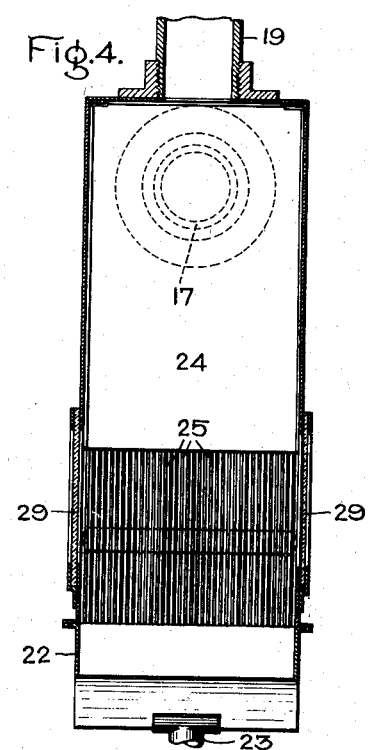
Figure 5:
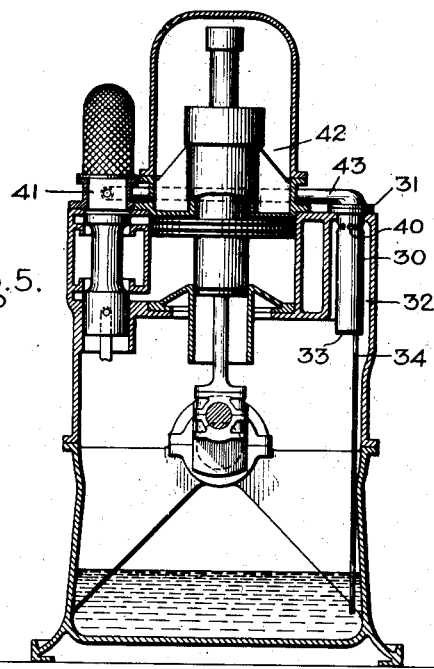
Figure 6:
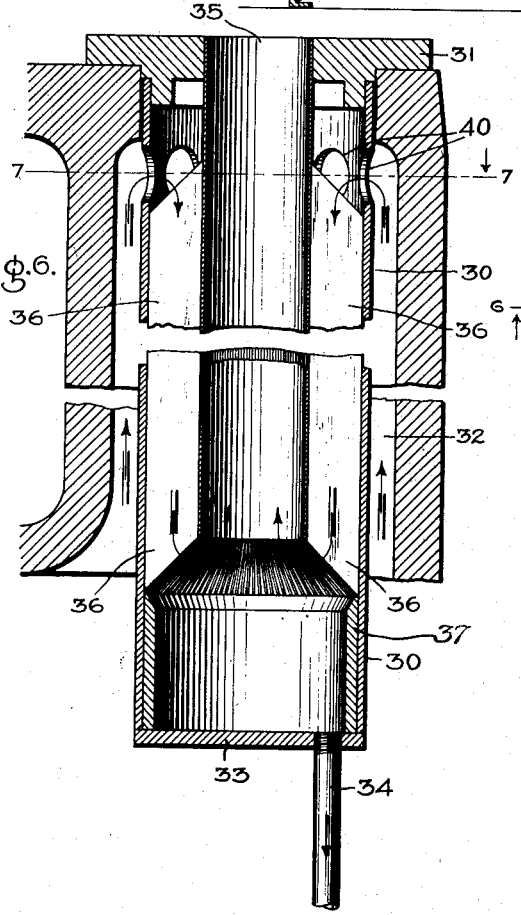

In the accompanying drawing, Figure 1 is a vertical section showing my improved separator applied to the crank case of an internal combustion engine; Fig. 2 is a vertical section through the separator; Fig. 3 is a section taken on line 3—3 Fig. 2; Fig. 4 is a section taken on line 4—4, Fig. 2, looking in the direction indicated by the arrows; Fig. 5 is a view similar to Fig. 1 showing the application of a second form of my separator to the crank casing of an internal combustion engine; Fig. 6 is a vertical sectional view of the separator shown in Fig. 5, the section being taken on line 6—6 of Fig. 7, and Fig. 7 is a section taken on line 7—7 of Fig. 6.

Referring to the drawing Fig. 1, 10 indicates the crank case of an internal combustion engine upon which is mounted a multistage compressor 11 which may be operated from a crank on engine shaft 12. 13 indicates the inlet valve of the compressor operated from the crank shaft through lever 14, and 15 the air admission side of the valve 13. Air is supplied to the compressor from the atmosphere through the screen 16 and from the crank case through pipe 17, separator 18 and pipe 19. As the present invention is concerned particularly with the construction of the separator 18 further description of the associated parts is unnecessary. It will be understood that they are of known construction.

Referring now to Figs. 2, 3 and 4, the casing of the separator is rectangular in cross section and comprises the side walls 20, top wall 21 and conical bottom wall 22, which is provided with a drain pipe 23 which leads back to the crank casing as shown in Fig. 1. The inlet pipe 17 is connected to the casing at one end thereof and preferably to a side wall near the top and spaced from it is the exit conduit 19, which is shown as connected to the top 21; 24 is a dividing wall located between the inlet and exit openings and extending from the top 21 of the casing to a point short of the bottom thereof. It is provided with suitable flanges by which it is fastened to the top and side walls. This dividing wall forms a deflecting plate so that the air and suspended materials entering through conduit 17 are forced to flow first downward and then up again, as indicated by the arrows, Fig. 2, in order to reach the outlet conduit 19. In this manner their direction of flow is sharply changed, the particles carried along in suspension being thrown out, falling to the bottom of the casing and out by way of drain pipe 23. As stated above, however, this changing of the direction of flow does not separate the fog out from the air, and to take care of this I provide between the inlet conduit and the dividing wall a means which acts after the manner of a condenser to condense the fog and form it into minute particles. To this end I provide between the dividing wall and the wall of the casing on the side of the wall 24 which is next to the inlet conduit 17, a plurality of spaced parallel plates 25. The plates are spaced apart by means of spacing blocks or washers 26 and are held together by bolts 27. They are of parallelogrammic shape as best shown in Fig. 2, and when in position leave the unobstructed space 28 adjacent the inlet so that the air can distribute itself across the entire width of the casing. The distance between the plates and their area will depend upon the amount of air flowing to be acted upon, and will be such as to divide the air flow up sufficiently and bring it into contact with sufficient surface to produce the desired result. By this means the fog will be condensed by these plates and will to a greater or less extent settle on them, dripping off the lower edges. That which passes on with the air, however, will be in the form of small particles which will be thrown out by gravity as already explained. Owing to the beveled lower edges of the plates 25 the drops which form on the plates will have a tendency to run toward the wall of the casing and thus out of the path of the air so that the air will not again pick up any particles after they are separated out. 29 indicates glazed openings in the casing wall through which the action of the separator may be observed.

Figure 7:
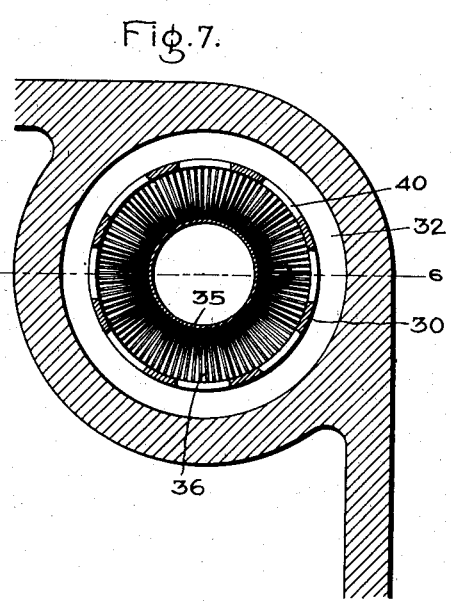

In Figs. 5, 6 and 7 I have shown a second form of my invention. In this arrangement the separator is circular in section and is located inside the crank casing. 30 indicates the casing of the separator. It is provided with a flanged head 31 which supports it in a pocket 32 in the upper portion of the crank casing, the flange engaging the top wall of the crank casing. 33 indicates the bottom of the separator provided with a drain pipe 34. Carried by the flanged head 31 is an annular depending dividing wall 35 which corresponds to wall 24 of Figs. 1 to 4. It depends to a point short of the bottom 33 and between it and the casing 30 are arranged the spaced parallel plates 36 supported at their lower edges by the member 37. The plates rest against the outer wall of the member 35 and the inner wall of casing 30, and are spaced the desired distance apart as explained in connection with Figs. 2 to 4. The upper end of the casing 30 is provided with openings 40 for the passage of air to the separator. The space within the depending wall 35 is connected to the inlet side 41 of the compressor 42 by pipe 43.

The operation of the arrangement shown in these figures is the same as that already described in connection with Figs. 1 to 4 and will be readily understood, the direction of flow being indicated by the arrows in Fig. 6. The air flows up around the outer side of the casing 30 and into the separator through openings 40. From here it passes down between the plates 36, turns sharply through 180° at the lower edge of member 35 and passes up through member 35 and then by way of pipe 43 to the inlet side of the compressor.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In a separator, the combination of a casing having an inlet and an outlet, a partition member in the casing for causing the substance flowing through the casing to change its direction of flow, and a plurality of plates arranged in parallel relation to each other in the casing in advance of said partition member as regards the direction of flow and extending across the space between the partition and the casing wall, said plates being arranged close together and having their lower edges beveled so as to direct the fluid condensed on them toward the casing wall and out of the path of the flowing substance.

2. In a separator, the combination of a casing having an inlet opening and an outlet opening arranged adjacent one end thereof and a drain opening at the other end, a partition member in the casing arranged between said two openings and attached to the end of the casing adjacent them, said partition members extending to a point short of the other end of the casing, and a plurality of parallel plates arranged between the partition members and the casing on the side of the partition member next to the inlet opening and extending entirely across the space between them, said plates being arranged close together and having their lower edges beveled so as to direct the fluid condensed on them toward the casing wall and out of the path of the flowing substance.

In witness whereof, I have hereunto set my hand this sixteenth day of June, 1915.

HENRY W. STOCK.